July 21, 1964   A. R. KROODSMA ETAL   3,141,582
SLIDING TYPE DISPENSER
Filed May 22, 1961

INVENTORS
CLEMENS A. WARNKE
ADALINE R. KROODSMA
BY
ATTORNEYS

United States Patent Office 3,141,582
Patented July 21, 1964

3,141,582
SLIDING TYPE DISPENSER
Adaline R. Kroodsma, 1238 Seneca SW., Wyoming, Mich., and Clemens A. Warnke, 610 Atwood NE., Grand Rapids, Mich.
Filed May 22, 1961, Ser. No. 111,616
2 Claims. (Cl. 222—284)

This invention relates to a dispenser, and more particularly to a reciprocating type dispenser.

There are presently known many varieties or types of dispensers. Certain of these dispensers are of the pump variety which increases pressure within the container, thus forcing out the substance within the container through a conduit. Although this type of dispenser is ideal for liquids, it is not particularly adapted to the dispensing of solid, granular, or powdered material. Furthermore, this type of dispenser does not accurately dispense a measured quantity.

Many types of dispensers utilize some form of structure which projects into the container and has a receptacle which can be filled by substance within the container. The structure can then be withdrawn from the container and removed from the receptacle. This type of dispenser has the advantage that is equally applicable to liquids as well as solids in granular or powdered forms. A further advantage of this type dispenser is that the receptacle can be dimensioned to a particular size whereby measured quantities may be dispensed.

The present invention is concerned with a dispenser of the latter type. It is designed to provide an improvement over presently existing dispensers of the same type.

It is therefore an object of this invention to provide a dispenser which can be utilized to dispense both solids and liquids.

Still another object of this invention is to provide a dispenser which dispenses a measured quantity.

Yet another object of this invention is to provide a dispenser which will selectably dispense different quantities of substances.

Yet another object of this invention is to provide a dispenser which is constructed from a minimum number of components, thereby providing a competitive article of manufacture.

These and other objects and advantages will become more apparent upon reading the following specification in conjunction with the accompanying drawings.

Basically, this invention is concerned with a dispenser utilized for dispensing measured quantities from a container. The dispenser includes a stopper which fits into the mouth or top of the container and acts as closure member. The stopper also has an aperture which slidably receives a dispensing member. The dispensing member has a plunger portion which extends into the container. The plunger is provided with slot-like receptacles which receive the substance within the container. The stopper has a relief formed therein which provides a flow path for the substance to travel into the receptacle. The stopper also acts as a bottom for the particular receptacle aligned with the relief. A handle is fixed to the plunger and utilized to withdraw the plunger filled with substance from the stopper. As the plunger is withdrawn, the stopper ceases to function as a bottom for the receptacle and the substance is dispensed. Since the plunger is of substantial length, several sizes of receptacles may be utilized, thereby providing for the dispensing of various measured amounts of substance. The dispensing member is also provided with a collar and abutment pin which engage the stopper, limiting the degree to which the plunger extends into and can be withdrawn from the container.

The dispenser assembly is designated generally as 10. The assembly includes the stopper 13 and the dispenser member 30.

Figure 1:
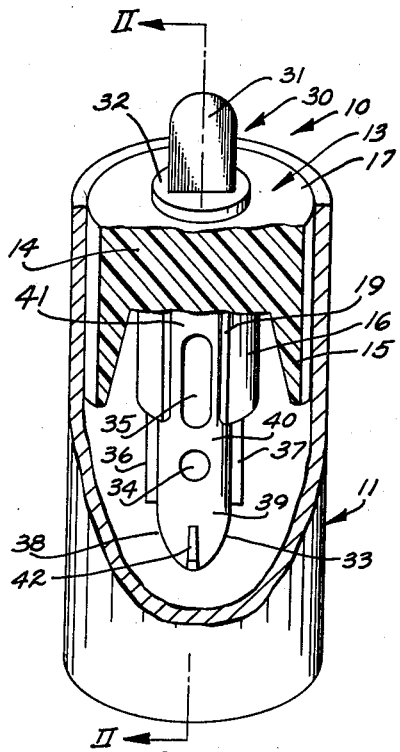
FIG. 1 is a perspective view showing the dispenser of this invention installed in a container which is partially cut away to reveal the dispenser.

Referring more specifically to the details of the invention, FIG. 1 best shows the container 11. The container 11 is of conventional design and may be constructed of metal, glass, plastic or any of the various materials utilized for constructing containers. The container has a mouth which is adapted to receive the stopper 13.

For purposes of illustration, the stopper 13 is shown in the shape of a right cylinder; however, it is to be understood that within the broadest aspect of this invention the configuration of this member may take various designs. The stopper 14 a portion of which is in the form of an outer peripheral ring 15 and inner ring 16, the outer ring 15 engages the mouth 13 of the container. The stopper 15 may be made from a resilient material such as rubber or plastic, and made slightly oversized so as to be forceable into the mouth of the container and form a friction lock therewith. The stopper may also take the form of a cap and have threads for threaded engagement with a jar top. The top 17 and bottom 18 of the stopper are flat surfaces. A centrally disposed aperture 20 is formed through the stopper body 14. A relief 19 is formed by cutting away a portion of the inner ring 16. The relief 19 communicates with the aperture 20. The aperture 20 from the stopper top 17 to the relief 19 is the aperture neck 23 which is of a length greater than the length of the biggest receptacle for purposes which will be explained more fully hereinafter. Guide grooves 21 and 22 are formed in the inner ring 16 and also communicates with the aperture 20. They are located at a right angle with respect to the relief 19 and are oppositely disposed from each other. The guide grooves 21 and 22 receive guide ribs formed on the dispenser member 30.

Figure 2:
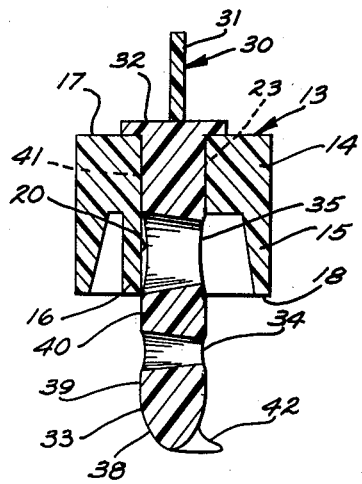
FIG. 2 is a cross-sectional view taken along the section lines II—II of FIG. 1.
Figure 4:
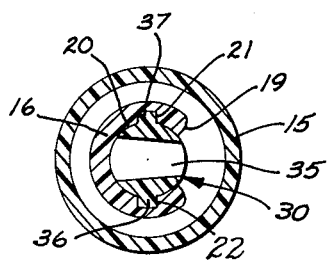
FIG. 4 is a cross-sectional view taken along the section lines IV—IV of FIG. 3.
Figure 3:
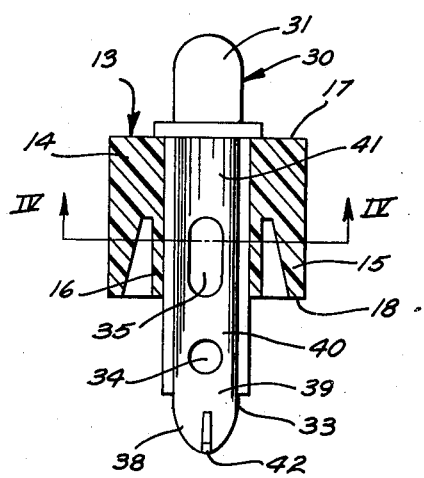
FIG. 3 is a cross-sectional view taken along the section lines III—III of FIG. 1.

The dispenser member 30 is an elongated, generally cylindrical member. The dispenser 30 has a plunger portion 33 which is slidably received in the aperture 20 formed in stopper body 14 and inner ring 16. The plunger 33 is provided with slots 34 and 35, as best shown in FIGS. 2 and 3. The slots extend through the plunger and form receptacles when used in conjunction with the stopper as will be explained more fully hereinafter. The slots 34 and 35 may take various configurations but are shown respectively as circular and oblong for disclosure purposes. The slots 34 and 35 are dimensioned so as to dispense a measured quantity. The slots are made larger at the bottom than the top, so that the measured material will be discharged with ease. This invention has application to the culinary arts; for example, the slot 34 might be dimensioned to contain one-fourth teaspoon and the slot 35 one teaspoon. Obviously, the slots may be dimensioned to grams, ounces, and other such standards of measurement. It should also be understood that within the broadest aspect of this invention, additional slots may be added to the plunger to measure more, less or different quantities of substances.

Formed integral with the plunger are guide ribs 36 and 37. The guide ribs 36 and 37 extend throughout substantially the entire length of the plunger and are located transversely with respect to the slots 34 and 35. The guide ribs 36 and 37 are received respectively by guide grooves 22 and 21. Since the guide grooves 22 and 21 are located transversely with respect to the relief 19, the slots 34 and 35 will be placed in alignment with the relief 19. The guide ribs 36 and 37 are utilized when the plunger is circular in configuration. The plunger may be made square in cross-sectional configuration in which case the ribs are not necessary and are omitted.

The slots 34 and 35 are spaced from each other in the plunger 33, and a land 40 is formed therebetween. Land 39 and 41 are also formed on the respective ends of the slots 34 and 35. The lands in effect, operate as a seal in a manner which will be explained more fully hereinafter in the description of the operation.

The end 38 of the plunger is somewhat pointed to facilitate the insertion of the plunger into the substance contained by the container. An abutment pin 42 is formed on the plunger end and engages the stopper to prevent complete withdrawal of the plunger. It is aligned with the relief 19 to permit the slot 34 to be withdrawn beyond the stopper top 17.

Fixed to the other end of the plunger 33 is a disklike collar 32. The collar 32 is of greater diameter than the aperture 20. The collar 32 thus acts as a stop when it engages the stopper top 17, determining the degree to which the plunger 33 may extend into the container. Fixed to the collar 32 is a handle 31. The handle 31 projects from the stopper and is gripped by the operator to withdraw the plunger from the container.

*Operation*

The dispenser operates to dispense a measured quantity of substance from a container. For example, it will be assumed that the dispenser is being used to dispense salt. The salt is placed in the container 12. The stopper 15 is inserted in the mouth of the container and will frictionally lock therewith. The dispenser assembly is now in position to dispense the salt from the container.

If it is desired to dispense a teaspoon of salt, the quantity which the slot 35 will dispense, the dispenser 30 is inserted into the container until the collar 32 abuts the stopper top 17. As illustrated in FIGS. 2 and 3, the slot 35 will then be within the relief 19. Notice also that the edge of land 40 just rests on the end of aperture 20. Thus, the aperture 20 forms a bottom for the slot 35 which is, in effect, a receptacle. The container 12 is positioned so that the salt flows through the relief 19 into the slot 35. This can be accomplished by merely inverting the container. The slot 35 will fill with salt. The user then pulls on the handle 31 and withdraws the plunger from the container. Due to the aperture 20, any excess salt in the slot 35 will be scraped off as the plunger is withdrawn. As the slot 35 passes the top 17, the salt within the slot will be dispensed. The plunger is withdrawn until the back of slot 35 is beyond the top 17. A teaspoon of salt has then been dispensed. It is important that the dispenser aperture neck 23 be at least as long as the slot 35 so that the slot 35 does not simultaneously register with the relief 19 and the position above the stopper top 17 so that a quantity greater than the volume of the slot 35 is dispensed.

If it is desired to dispense a one-quarter of a teaspoon of salt, which is the volume of the slot 34, the plunger is withdrawn until the land 39 registers with the aperture 20 and the slot 34 is placed in alignment with the relief 19. The land 40 prevents the container substance from escaping out the dispenser aperture neck 23, and the land 39 contacts the walls of aperture 20. The dispenser aperture 20 thus again forms a bottom for the slot 34 and a receptacle. The container is inverted and the salt fills the slot 34. The plunger is then withdrawn. The dispenser aperture neck 23 will scrape off the excess salt and when the slot 34 assumes a position above the stopper top 17 the salt will be dispensed. It should be noted that during this dispensing operation the slot 35 is outside the container and thus presents no problems. If it is desired to dispense half a teaspoon of salt, the above operation is repeated twice, and three times for three-quarters of a teaspoon of salt.

If the device is to be utilized to dispense liquid, it may be desirable to provide the lands 39, 40 and 41 with O-ring seals. The engagement of the seals with the dispenser aperture 20 prevents leakage from the particular slot registered with the relief 19.

From the above description, it can be seen that the present invention may be utilized for dispensing various quantities of substance, both liquid and solid, from a container. The device measures the substance quickly and accurately. The dispenser is constructed of a minimum number of simply designed parts which can be manufactured economically, providing a competitive article of manufacture.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

We claim:

1. A dispensing device comprising: stopper means adapted to fit in and close the mouth of a container; said stopper means having an aperture slidably receiving the plunger of a dispenser; said plunger extending into said container and communicating with substance contained therein; a plurality of through-slots of different sizes formed in said plunger for receiving said substance and lands formed between and at the ends of said slots; said stopper means having an inner relief to form a flow path for substance within said container to a certain plunger slot positioned within said recess, and to form a temporary bottom for said certain slot only so that substance is retained therein while passing through the remaining slots; guide grooves formed in said stopper and guide ribs formed on said plunger for directing the movement of said plunger and orienting said certain receptacle with respect to said relief; handle means secured to said plunger for inserting said plunger and withdrawing said plunger and substance from said container a certain amount for dispensing a controlled volume of substance depending on the certain slot in said recess; means fixed to one end of said plunger and engaging the top of said stopper to limit the degree of extension of said plunger into said container; and abutment means fixed to the other end of said plunger and engaging said stopper to prohibit complete withdrawal of said plunger from said stopper.

2. A dispensing device comprising: stopper means adapted to fit in and close the mouth of a container; said stopper means having an aperture slidably receiving the plunger of a dispenser; said plunger extending into said container and communicating with substance contained therein; a plurality of through-slots of different sizes formed in said plunger for receiving said substance, and lands formed between and at the ends of said slots; said stopper means having an inner relief recess to form a flow path for substance within said container to a certain plunger slot positioned within said recess, and to form a temporary bottom for said certain slot so only that substance is retained therein while passing through the remaining slots; guide grooves and cooperating ribs between said stopper means and said plunger for directing the movement of said plunger and orientating said certain slot with respect to said recess; and handle means secured to said plunger for inserting said plunger and withdrawing said plunger and substance from said container a certain amount for dispensing a controlled volume of substance depending on the certain slot in said recess.

References Cited in the file of this patent

UNITED STATES PATENTS

| | | |
|---|---|---|
| 890,018 | Burt | June 9, 1908 |
| 1,289,446 | Griffiths | Dec. 31, 1918 |
| 2,063,605 | Janssens | Dec. 8, 1936 |
| 2,358,913 | Dobkin | Sept. 26, 1944 |
| 2,767,889 | Manrose | Oct. 23, 1956 |
| 2,851,202 | Bradbury | Sept. 9, 1958 |
| 2,983,408 | Schwartz | May 9, 1961 |
| 3,040,937 | Lantery | June 26, 1962 |